United States Patent
Kim

(10) Patent No.: US 8,871,386 B2
(45) Date of Patent: Oct. 28, 2014

(54) SECONDARY BATTERY

(75) Inventor: Dae-Kyu Kim, Suwon-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 1002 days.

(21) Appl. No.: 12/260,397

(22) Filed: Oct. 29, 2008

(65) Prior Publication Data

US 2009/0136840 A1 May 28, 2009

(30) Foreign Application Priority Data

Nov. 23, 2007 (KR) .................. 10-2007-0120325

(51) Int. Cl.
*H01M 4/02* (2006.01)
*H01M 2/02* (2006.01)
*H01M 2/26* (2006.01)
*H01M 2/04* (2006.01)
*H01M 10/04* (2006.01)

(52) U.S. Cl.
CPC ............... *H01M 2/263* (2013.01); *Y02E 60/12* (2013.01); *H01M 2/0413* (2013.01); *H01M 10/0431* (2013.01)
USPC ............................ 429/211; 429/166; 429/163

(58) Field of Classification Search
CPC ................... H01M 10/0431; H01M 2/0413
USPC .................. 429/122–208, 405, 211
See application file for complete search history.

(56) References Cited

U.S. PATENT DOCUMENTS

| | | | |
|---|---|---|---|
| 2002/0168565 A1* | 11/2002 | LeBouchard et al. | 429/161 |
| 2005/0266279 A1* | 12/2005 | Kim | 429/7 |
| 2006/0051666 A1* | 3/2006 | Kim | 429/184 |

FOREIGN PATENT DOCUMENTS

| | | | |
|---|---|---|---|
| JP | 2000-285898 | | 10/2000 |
| JP | 2002-141051 | | 5/2002 |
| JP | 2002141051 | * | 5/2002 |
| JP | 2003-77446 | | 3/2003 |
| JP | 2004-152707 | | 5/2004 |
| JP | 2006-100097 | | 4/2006 |
| JP | 2006-100097 A | * | 4/2006 |
| JP | 2006100097 | * | 4/2006 |
| JP | 2006-252834 | | 9/2006 |
| JP | 2007-165115 | | 6/2007 |

* cited by examiner

*Primary Examiner* — Helen O Conley
(74) *Attorney, Agent, or Firm* — Knobbe Martens Olson & Bear LLP

(57) ABSTRACT

A secondary battery comprising an electrode assembly including: a first electrode plate connected to a first electrode tab, a second electrode plate connected to a second electrode tab, and a separator disposed therebetween; a can having an opening, to house the electrode assembly; and a cap assembly to seal the opening. The first electrode tab has a reinforcement portion. The first electrode tab has a welding portion connected to the cap assembly and a bent portion formed in the reinforcement portion, which is thicker than the welding portion.

17 Claims, 8 Drawing Sheets

SECONDARY BATTERY

CROSS-REFERENCE TO RELATED APPLICATION

This application claims the benefit of Korean Patent Application No. 2007-120325, filed Nov. 23, 2007, in the Korean Intellectual Property Office, the disclosure of which is hereby incorporated herein by reference in its entirety.

BACKGROUND OF THE INVENTION

1. Field of the Invention

Aspects of the present invention relate to a secondary battery, and more particularly, to a secondary battery that prevents electrode tabs from breaking, and has improved weldability.

2. Description of the Related Art

A secondary battery can be repetitively charged and discharged, which differs from a dry cell that can only be discharged once. Secondary batteries have been actively developed, and are widely used, because they can be small and can have high-densities.

Low-density batteries, in which one battery cell is wrapped in a case, have been used in small-sized portable electronic devices, such as portable phones, PDPs, notebook computers, cameras, and the like. High-density batteries, in which a number of battery cells are connected, have been used to power motors, such as a motor in a hybrid automobile, etc.

Lithium secondary batteries have three times the operating voltage, as compared to conventional Nickel-Cadmium and Nickel-Hydrogen batteries, and also have higher energy density per unit weight. Accordingly, lithium secondary batteries are being used in an increasing number of applications.

Lithium secondary batteries can be divided into can-type and pouch-type, according to the shape of a case housing the electrode assembly. The can-type can be prismatic or cylindrical. Lithium secondary batteries can be classified as Lithium-ion, or lithium-polymer secondary batteries, according to the type of electrolyte included therein.

When a lithium secondary battery is over-charged, the electrolyte evaporates at an upper portion of the electrode assembly, thereby increasing resistance. Further, lithium can be precipitated, since a deformation occurs around the center of the electrode assembly. Heat can be locally generated, due to the increase of resistance at the upper portion of the electrode assembly, thereby increasing an internal temperature of the secondary battery. An internal pressure of the secondary battery can abruptly increase, due to the action of electrolyte additives, such as Cyclo-Hexane Benzen (CHB), benzophenone (BP), and the like, which easily dissolve, and generate gas during over-charging. The safety of a lithium secondary battery can be improved, by interrupting current flow at a cap assembly, to prevent further increases in the internal temperature or pressure of the battery.

A cylindrical secondary battery comprises a can, a cap assembly to seal the can, an insulating gasket to insulate the cap assembly from the can, and an electrode assembly wound in jelly-roll shape, contained in the can. An electrolyte is injected into the can. The electrode assembly comprises two electrode plates, and a separator interposed between the electrode plates, to prevent the electrode plates from shorting.

The electrode assembly is electrically connected to the can and cap assembly. Specifically, a negative electrode tab of the electrode assembly is connected to the can, and a positive electrode tab of the electrode assembly is connected to the cap assembly. When the positive electrode tab is connected to the cap assembly, the positive electrode tab should be extended for effective welding. When the cap assembly is combined with a top portion of the can, after being welded to the positive electrode tab, a portion of the positive electrode tab is bent, which is referred to as a bent portion. The bent portion can easily be cut, due movements of battery. The positive electrode tab may be broken, and may form a short circuit, thereby causing safety concerns.

SUMMARY OF THE INVENTION

Aspects of the present invention provide a secondary battery comprising: an electrode assembly including a first electrode plate connected to a first electrode tab, a second electrode plate connected to a second electrode tab, and a separator disposed therebetween; a can having an opening, to house the electrode assembly; and a cap assembly to seal the opening. The first electrode tab comprises a reinforcement portion.

According to aspects of the present invention, the first electrode tab comprises a bent portion disposed between the cap assembly and the can.

According to aspects of the present invention, the bent portion is formed in the reinforcement portion.

According to aspects of the present invention, the reinforcement portion is formed by joining a reinforcement plate to the first electrode tab.

According to aspects of the present invention, the reinforcement portion is thicker than other portions of the first electrode tab.

Aspects of the present invention provide a secondary battery comprising: an electrode assembly including a first electrode plate connected to a first electrode tab, a second electrode plate connected to a second electrode tab, and a separator disposed therebetween; a can having an opening, to house the electrode assembly; and a cap assembly to seal the opening. The first electrode tab comprises a welding portion connected to the cap assembly, and a bent portion that is thicker than the welding portion.

According to aspects of the present invention, the first electrode tab is joined with a reinforcement plate, and the reinforcement plate is disposed on the bent portion.

According to aspects of the present invention, the reinforcement portion is thicker than other portions of the first electrode tab.

According to aspects of the present invention, the reinforcement portion is formed by joining together overlapped portions of the electrode tab.

Additional aspects and/or advantages of the invention will be set forth in part in the description which follows, and, in part will be obvious from the description, or may be learned by practice of the invention.

BRIEF DESCRIPTION OF THE DRAWINGS

These and/or other aspects and advantages of the invention will become apparent and more readily appreciated from the following description of the exemplary embodiments, taken in conjunction with the accompanying drawings, of which.

DETAILED DESCRIPTION OF THE EMBODIMENTS

Figure 1A:
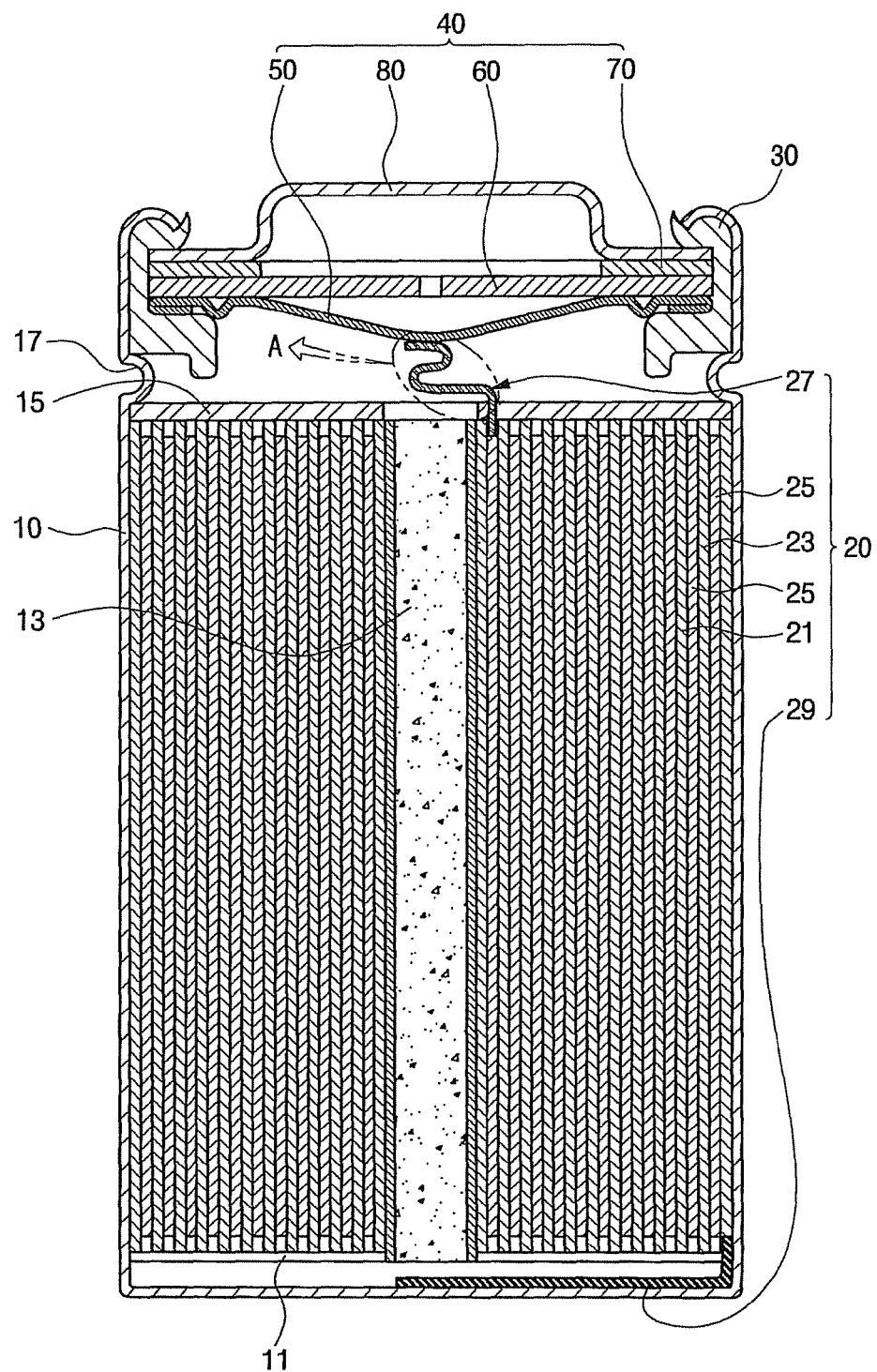
FIG. 1A is a sectional view illustrating a structure of a secondary battery, according to a first exemplary embodiment of the present invention.

Reference will now be made in detail to the exemplary embodiments of the present invention, examples of which are illustrated in the accompanying drawings, wherein like reference numerals refer to the like elements throughout. The exemplary embodiments are described below, in order to explain the aspects of the present invention, by referring to the figures. Further, the thickness and length of layers and regions may be exaggerated for convenience.

Figure 1B:
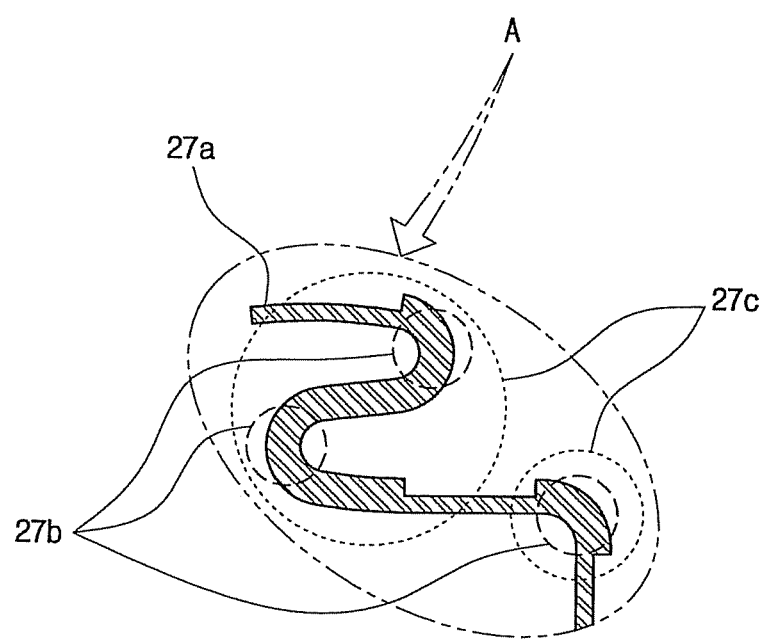
FIG. 1B is an extended view of region A of FIG. 1A.
Figure 2:
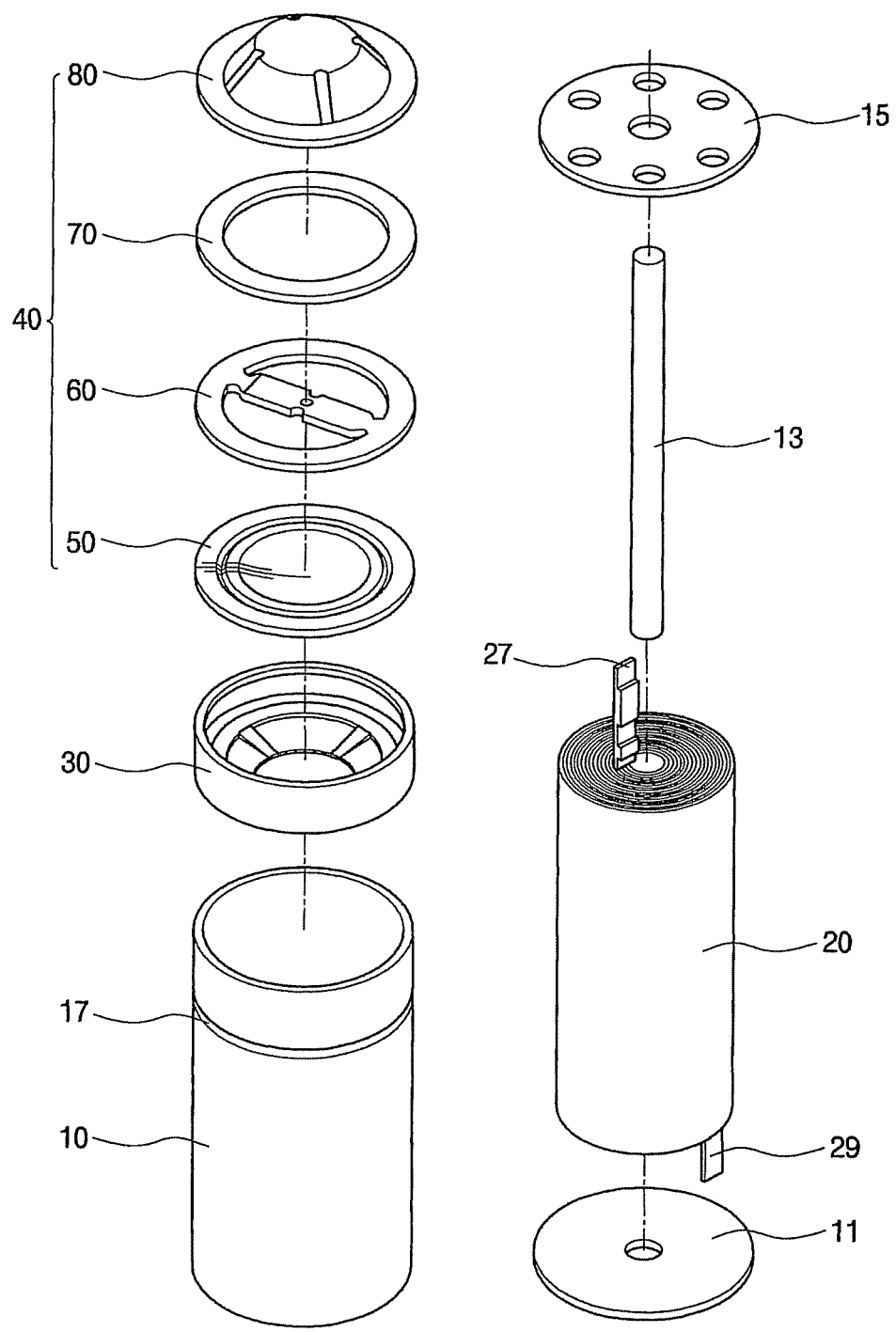
FIG. 2 is an exploded perspective view illustrating the structure of the secondary battery of FIG. 1A.

FIGS. 1A and 2 are sectional and exploded perspective views illustrating the structure of a secondary battery, according to a first exemplary embodiment of the present invention. FIG. 1B is an extended view of region A of FIG. 1A. Referring to FIGS. 1A through 2, the secondary battery includes an electrode assembly 20, a can 10 to house the electrode assembly 30, and a cap assembly 40 to seal the can 10.

The electrode assembly 20 includes two electrode plates 21 and 23 that are stacked together, with one or more separators 25 disposed therebetween. The electrode assembly 20 is wound into a jelly-roll. The separators 25 are disposed between the two electrode plates 21 and 32, at a lower portion and an upper portion of the electrode plates 21 and 23. The separators 25 prevent the two electrode plates 21 and 23 contacting one another.

The electrode plates 21 and 23 are formed by coating positive and negative electrode active material slurries onto collectors. The collectors can be made of a metal foil or a metal mesh, which can be aluminum or copper. The slurries generally include a mixture of granular active materials, an auxiliary conductor, a binder, a plasticizer, and a solvent. The solvent is removed during a subsequent electrode-forming process.

The collectors have non-coating portions, where the slurries are not coated. Electrode tabs 27 and 29 are attached to the non-coating portions. The electrode tab 27 is connected to the cap assembly 40. The electrode tab 29 is connected to the can 10. Hereinafter the electrode tabs will be referred to a first electrode tab 27 and a second electrode tab 29.

The first electrode tab 27 comprises a welding portion 27a that is welded to the cap assembly 40, and bent portions 27b that are formed when the cap assembly 40 is attached to the can 10. The first electrode tab 27 may comprise reinforcement portions 27c that are reinforced or thickened, so as not to be easily broken, due to outside impacts. The bent portions 27b are formed in the reinforcement portions 27c.

The welding portion 27a is generally not very thick, which provides for better welding characteristics. Accordingly, aspects of the present invention may prevent the formation of weak welds, which can result from overly thick welding portions, and can prevent the bent portions 27b from being broken, since the bent portions 27b are formed on the reinforcement portions 27c.

Provided hereinafter is a description of the reinforcement portions 27c, with reference to FIGS. 3A through 4E. The can 10 may be implemented in various shapes, including prismatic, cylindrical, and the like. The can 10 may be formed by a deep drawing method using iron, an aluminum alloy, steel, and the like.

When the can 10 is cylindrical, the can 10 has a cylindrical side surface, a bottom surface disposed on one end of the side surface, and an opening opposing the bottom surface. The electrode assembly 20 may be inserted into the can 10, through the opening.

The electrode assembly 20 can include a lower insulating plate 11 to cover a bottom surface of the electrode assembly. The second electrode tab 29 may be bent, to be parallel with the bottom surface of the can 10, around the lower insulating plate 11. The electrode assembly 20 is formed into a jelly-roll, and has a hollow axial center portion.

A hole may be formed in the lower insulating plate 11, at a region corresponding to the axial center portion of the electrode assembly 20. The second electrode tab 29 can extend across the hole of the lower insulating plate 11. A welding rod may be inserted through the axial center portion of the electrode assembly 20, to weld the second electrode tab 29 to the bottom surface of the can 10. Accordingly, the can 10 may have same polarity as the second electrode tab 29, so that the can 10 is an electrode terminal.

According to exemplary embodiments of the present invention, the can 10 may comprise a center-pin 13 that is disposed in the axial center portion. The center-pin 13 can prevent an external force from deforming the electrode assembly 20, can provide a gas passage to release gas from the electrode assembly 20, and can suppress deformations due to frequent charging/discharging of the electrode assembly 20. The center-pin 13 may thereby extend the life-time of the battery.

After the second electrode tab 29 is welded, an upper insulating plate 15 may be disposed over the electrode assembly 20. The first electrode tab 27 may extend from the electrode assembly 20, through a hole of the upper insulating plate 15. In a case where the upper insulating plate 15 has a hole in the center, the second electrode tab 29 may be welded after installation of the upper insulating plate 15. A bead 17 may be formed by crimping a sidewall of the can 10, adjacent to the top of the electrode assembly 20, and/or the upper insulating plate. The bead 17 may provide a highly reliable electrical connection, by prohibiting the electrode assembly from fluctuating in the can 10.

An electrolyte may be injected into the can 10, over the electrode assembly 20. The injection of the electrolyte may be carried out before forming the bead. An insulating gasket 30 may be inserted into the opening of the can 10, and the cap assembly 40 may be combined with the insulating gasket 30, so as to seal the can 10. The insulating gasket 30 may be an insulating elastic material. The insulating gasket 30 may completely cover an outer circumference of the cap assembly 30, and may seal the can 10, as well as insulate the cap assembly 40 from the can 10, which has a different polarity than the cap assembly 40.

The cap assembly 40 may be installed as a unit on the insulating gasket 30. Alternatively, the components of the cap assembly 40 may be sequentially stacked onto the insulating gasket 30. The cap assembly 40 may comprise a vent 50 that is electrically connected to the first electrode tab 27, a current interrupt device (CID) 60 to interrupt a current path according to the operation of the vent 50, a PTC thermistor 70, and a cap-up 80 electrode terminal. In the cap assembly 40, the cap-up 80 is disposed over the PTC thermistor 70, the CID 60 is disposed under the PTC thermistor 70, and the vent 50 is disposed under the CID 60. In other words, starting from the bottom, the vent 50, the CID 60, the PTC thermistor 70, and the cap-up 80 are sequentially stacked.

The vent 50 may interrupt current flow through the CID 60, when an internal pressure exceeds a certain level, due to gas leakage from the electrode assembly 20. The vent 50 may exhaust the gas to the outside. The crimping process may be carried out by pressing downward along an inner wall of the cylinder type can 10, after the cap assembly 40 is installed on the can 10.

Figure 3A:
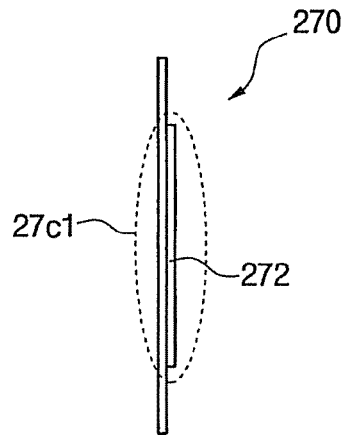
FIGS. 3A through 3E are plane views illustrating various electrode tabs having reinforcement portions, according to exemplary embodiments of the present invention.
Figure 3B:
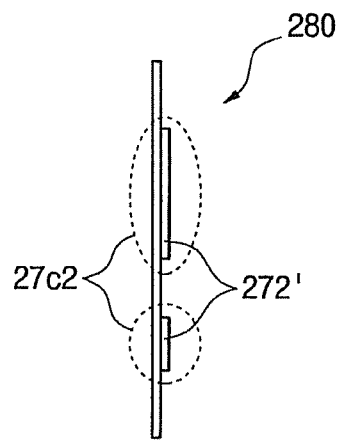

FIGS. 3A through 3E are plane views illustrating various electrode tabs having reinforcement portions, according to exemplary embodiments of the present invention. As shown in FIG. 3A, a first electrode tab 270 can include a reinforcement plate 272, which is attached thereto, so as to form a reinforcement portion 27c1. As shown in FIG. 3B, a first electrode tab 280 can include reinforcement plates 272', which are attached thereto, so as to form reinforcement portions 27c2. The reinforcement plates 272 and 272' may be attached to the first electrode tabs 270 and 280, by point welding, laser welding, ultrasonic welding, cream soldering, and the like.

Figure 3C:
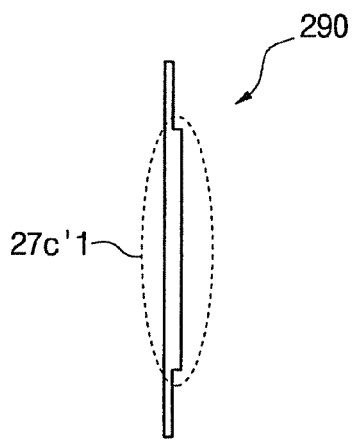
Figure 3D:
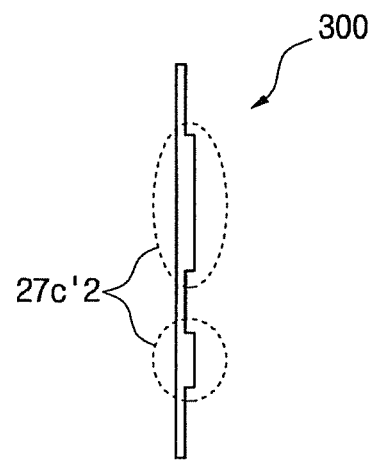

As illustrated in FIG. 3C, a first electrode tab 290 can include a reinforcement portion 27c'1, which is a relatively thicker portion of the first electrode tab 290. As illustrated in FIG. 3D, a first electrode tab 300 can include reinforcement portions 27'2, which are relatively thicker portions of the first electrode tab 300.

Figure 3E:
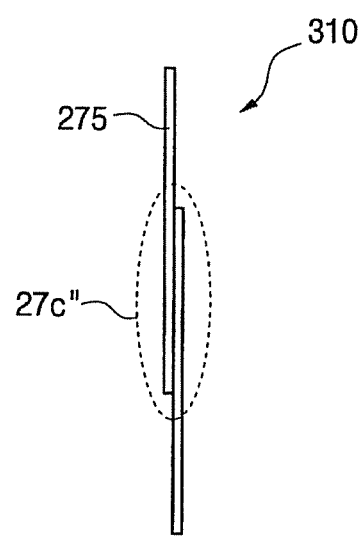
Figure 4A:
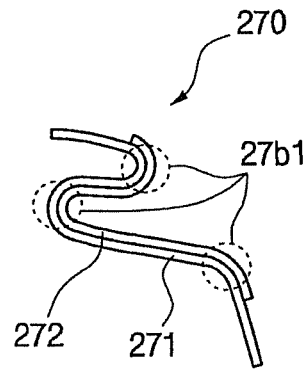
FIGS. 4A through 4E are sectional views illustrating electrode tabs with bent portions in the reinforcement portions of FIGS. 3A through 3E.
Figure 4B:
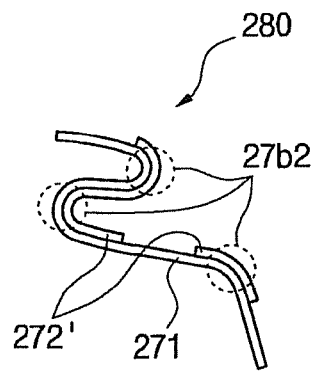
Figure 4C:
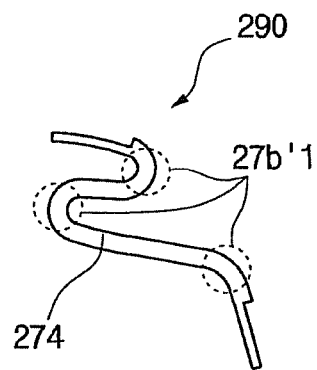
Figure 4D:
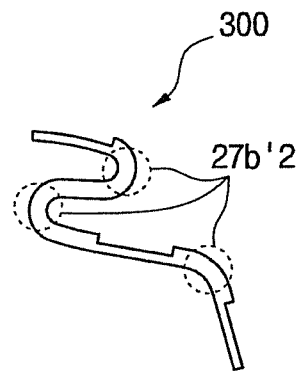
Figure 4E:
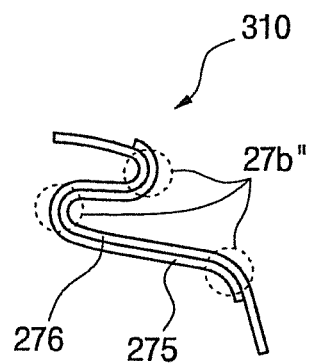

As illustrated in FIG. 3E, a first electrode tab 310 can include a reinforcement portion 27c", which is formed by overlapping, and joining, tab portions 275 and 276 of the first electrode tab 310. The tab portions 275 and 276 can be first joined together, and the tab portion 275 can then be attached to respective components of a battery. In the alternative, the tab portion 275 can be first connected to the respective components of a battery, and then joined together, so as to enhance the convenience of welding. The tab portions 275 and 276 may joined by one method among point welding, laser welding, ultrasonic welding, and cream soldering.

FIGS. 4A through 4E respectively show the electrode tabs of FIGS. 3A-3E, after bent portions are formed in the electrode tabs. In particular, bent portions 27b1, 27b2, 27b'1, 27'2, and 27b" are formed in the reinforcement portions 27c1, 27c2, 27c'1, 27c'2 and 27c", respectively. The reinforcement portions strengthen the bent portions.

Figure 5:
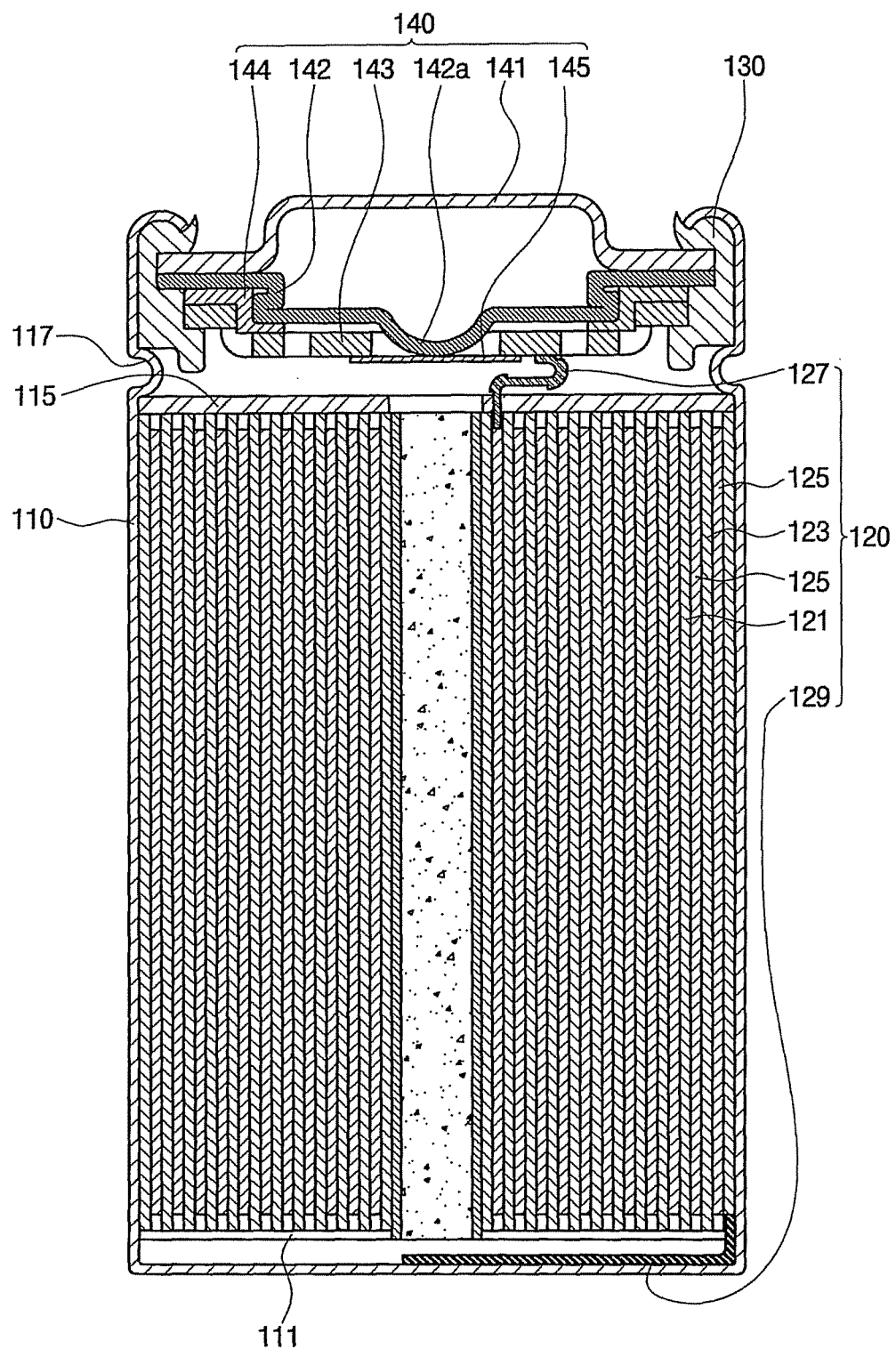
FIG. 5 is a sectional view illustrating the structure of a secondary battery, according to a second exemplary embodiment of the present invention.

FIG. 5 is a sectional view illustrating a structure of a secondary battery, according to a second exemplary embodiment of the present invention. Referring to FIG. 5, the secondary battery includes an electrode assembly 120 contained in a can 110, an insulating gasket 130 inserted into an opening of the can 110, and a cap assembly 140 is combined with the insulating gasket 130, to seal the can 110. Elements 110 through 130 of the secondary battery illustrated in FIG. 5 are identical to elements 10 through 30 of the secondary battery illustrated in FIGS. 1A through 4E. Accordingly, a detailed description thereof is omitted.

The cap assembly 140 may comprise a cap-up 141 and sub-components disposed under the cap-up 141. The sub-components may comprise a vent 142 having a downwardly protruded portion 142a, disposed under the cap-up 141, a cap-down 143 disposed under the vent 142, and a sub-plate 145 disposed under the cap-down 143.

An insulating member 144 may be interposed between the vent 142 and the cap-down 143, thereby insulating the vent 142 and the cap-down 143. The sub-plate 145 may be disposed across a center hole formed in the cap-down 143, and may be connected to the protruded portion 142a of the vent 142. Further, an electrode tab 127 protruding against the electrode assembly 120 may be connected to one surface of the cap-down 143, and to one surface of the sub-plate 145.

The bottom surface of the protruded portion 142a reverses upon an increase of internal pressure of battery, thereby cutting off an electrical connection with the sub-plate 145. The cap-down 143 may be electrically connected to the sub-plate 145 by laser welding, and the protruded portion 142a of the vent 142 may be electrically connected to the sub-plate 145, by ultrasonic welding, etc. A crimping process to seal the can 110 may be carried out by pressing an inner wall of the can 110, after the cap assembly 140 is combined with an opening of the can 110.

Although a few exemplary embodiments of the present invention have been shown and described, it would be appreciated by those skilled in the art that changes may be made in these exemplary embodiments, without departing from the principles and spirit of the invention, the scope of which is defined in the claims and their equivalents.

What is claimed is:

1. A secondary battery comprising:
    a can having an opening;
    a cap assembly disposed in the opening of the can, the cap including a vent; and
    an electrode assembly disposed in the can, the electrode assembly including,
        a first electrode plate,
        a second electrode plate,
        a separator disposed between the first and second electrode plates,
        a first electrode tab connected to the first electrode plate and the vent of the cap assembly, and
        a second electrode tab connected to the second electrode plate and the can,
        wherein the first electrode tab includes a welding portion, bent portions and at least one reinforcement portion, and
        wherein each of the bent portions are disposed in a reinforcement portion.

2. The secondary battery of claim 1, wherein the first electrode tab comprises at least one reinforcement plate forming the reinforcement portion.

3. The secondary battery of claim 2, wherein the number of reinforcement plates is smaller than the number of the bent portions.

4. The secondary battery of claim 2, wherein the first electrode tab and the reinforcement plate are joined by point welding, laser welding, ultrasonic welding, or cream soldering.

5. The secondary battery of claim 1, wherein the reinforcement portion is thicker than the welding portion.

6. The secondary battery of claim 1, wherein the first tab includes a first tab portion that is connected to the electrode assembly and a second tab portion that is connected to the cap assembly, and the reinforcement portion is a region overlapping the first and second tab portions.

7. The secondary battery of claim 6, wherein the first and second tab portions are joined by point welding, laser welding, ultrasonic welding, or cream soldering.

8. A secondary battery comprising:
    a can having an opening;
    a cap assembly disposed in the opening of the can, the cap assembly including a vent; and
    an electrode assembly disposed in the can, the electrode assembly including,
        a first electrode plate,
        a second electrode plate, a separator disposed between the first and second electrode plates, a first electrode tab connected to the first electrode plate and the vent of the cap assembly, and a second electrode tab connected to the second electrode plate and the can;

wherein the first electrode tab includes a welding portion that is welded to the vent, and reinforcement portions that are thicker than the welding portion, and wherein the first electrode tab bends at each of the reinforcement portions.

9. The secondary battery of claim 8, wherein the first electrode tab comprises at least one reinforcement plate forming the reinforcement portions.

10. The secondary battery of claim 9, wherein the first electrode tab and the reinforcement plate are joined by point welding, laser welding, ultrasonic welding, or cream soldering.

11. The secondary battery of claim 8, wherein the first electrode tab includes a first tab portion that is disposed near the electrode assembly and a second tab portion that is disposed near the cap assembly, and the second tab portion overlaps the first tab portion to form the reinforcement portion.

12. The secondary battery of claim 11, wherein the first and second tab portions are joined by point welding, laser welding, ultrasonic welding, or cream soldering.

13. A secondary battery comprising:
an electrode assembly comprising,
a first electrode plate,
a second electrode plate facing the first electrode plate,
a separator disposed between the first and second electrode plates,
a first electrode tab connected to the first electrode plate, the first electrode tab including a welding portion, a bent portion and a first reinforcement portion, and
a second electrode tab connected to the second electrode plate;
a can having an opening, to house the electrode assembly; and
a cap assembly disposed in the opening, and connected to the welding portion of the first electrode tab,
wherein each of the bent portions are disposed in a reinforcement portion.

14. The secondary battery of claim 13, wherein the first electrode tab further comprises a second reinforcement portion that is bent in a direction opposite to the first reinforcement portion.

15. The secondary battery of claim 13, wherein the reinforcement portion is formed by welding a plate to the first electrode tab.

16. The secondary battery of claim 13, wherein the first electrode tab is formed by overlapping a first tab portion that is connected to the electrode assembly, and a second tab portion that is connected to the cap assembly, and welding the first and second tab portions together at the overlap.

17. The secondary battery of claim 13, wherein the first reinforcement portion is bent three times.

* * * * *